United States Patent [19]

Okuyama et al.

[11] 4,336,310

[45] Jun. 22, 1982

[54] MAGNETIC RECORDING MEDIUM AND PREPARATION THEREOF

[75] Inventors: Kiyotaka Okuyama; Akihiko Hosaka; Yukihiro Isobe, all of Tokyo, Japan

[73] Assignee: TDK Electronics Co., Ltd., Tokyo, Japan

[21] Appl. No.: 208,265

[22] Filed: Nov. 19, 1980

[30] Foreign Application Priority Data

Jan. 28, 1980 [JP] Japan .................................. 55-7813

[51] Int. Cl.$^3$ ........................ B32B 9/04; H01F 10/02
[52] U.S. Cl. .................................... 428/447; 427/127; 427/128; 428/404; 428/405; 428/448; 428/695; 428/900
[58] Field of Search .............. 427/127, 128, 131, 132; 428/900, 694, 695, 331, 404, 405, 447, 448; 252/62.54

Primary Examiner—Bernard D. Pianalto
Attorney, Agent, or Firm—Oblon, Fisher, Spivak, McClelland & Maier

[57] ABSTRACT

A magnetic recording medium comprises a substrate coated with a magnetic layer comprising a binder resin and a metallic magnetic powder supporting silica on the surface which is coated with sequential layers of hydrolyzed silane compound and oleic acid. A magnetic recording medium is produced by sequentially treating a metallic magnetic powder supporting silica on the surface with a solution of a hydrolyzable silane compound and a solution of oleic acid to obtain a magnetic powder having the coated sequential layers and admixing the coated magnetic powder with a binder resin to prepare a magnetic composition and coating the magnetic composition on a substrate to form a magnetic layer.

3 Claims, No Drawings

MAGNETIC RECORDING MEDIUM AND PREPARATION THEREOF

BACKGROUND OF THE INVENTION

1. Field of the Invention

The present invention relates to a magnetic recording medium prepared by using a metallic powder as a magnetic powder and the preparation thereof. More particularly, it relates to a magnetic recording medium prepared by using a metallic magnetic powder having improved dispersibility and oxidation resistance and the preparation thereof.

2. Description of the Prior Arts

Recently, it has been common to use a magnetic recording medium prepared by coating a magnetic composition as a mixture of a magnetic powder and a binder resin on a film made of polyacetate, polyvinyl chloride or polyester as a substrate. Thus, if a metallic magnetic powder made of iron and cobalt is used as the magnetic powder, high mutual action is easily resulted between particles to cause coagulation of the particles and to prevent uniform dispersion of the particles in the binder resin because the metallic powder has remarkably larger magnetic moment in comparison with the oxide type magnetic powder such as iron oxide and chromium oxide which have been mainly used. Therefore, the metallic magnetic powder disadvantageously has not satisfactory electromagnetic characteristics and physical characteristics such as powder falling inhibition which are required for the magnetic recording medium. Moreover, the metallic magnetic powder has inferior oxidation resistance whereby the magnetic recording medium prepared by using such magnetic powder disadvantageously causes magnetic deterioration in ageing caused by the oxidation.

Various improvements have been considered to improve the dispersibility and the oxidation resistance of the metallic magnetic powder, however, no satisfactory result has been attained. For example, the metallic magnetic powder coated with a silane compound has excellent oxidation resistance, but has inferior dispersibility whereby the electromagnetic transfer characteristic is disadvantageously inferior. When the metallic magnetic powder is treated with oleic acid, the dispersibility is satisfactorily improved, but the oxidation resistance is not satisfactory.

SUMMARY OF THE INVENTION

It is an object of the present invention to provide a magnetic recording medium prepared by using a metallic magnetic powder having excellent dispersibility and oxidation resistance to give excellent electromagnetic transfer characteristics and a preparation thereof.

The foregoing and other objects of the present invention have been attained by providing a magnetic recording medium which comprises a substrate coated with a magnetic layer comprising a binder resin and a metallic magnetic powder supporting silica on the surface which is coated with sequential layers of hydrolyzed silane compound and oleic acid.

DETAILED DESCRIPTION OF THE PREFERRED EMBODIMENTS

Various studies for the conventional rust inhibitors and dispersing agents have been carried out. As a result, it has been found that the magnetic layer having excellent dispersibility of the magnetic powder can be formed and the oxidation resistance of the magnetic powder can be improved by sequentially treating the metallic magnetic powder supporting silica on the surface with a methanol solution of a hydrolyzable silane compound as R'Si(OR)$_3$ and a toluene solution of oleic acid so as to form sequential coated layers of the silane compound and the oleic acid and admixing the treated magnetic powder with a binder resin and coating the mixture on a substrate.

The present invention has been attained by the above studies. The object is to provide a magnetic recording medium obtained by using a metallic magnetic powder having improved dispersibility and oxidation resistance and the preparation thereof.

In one embodiment of the present invention, it provides a magnetic recording medium comprising a support coated with a magnetic layer comprising a binder resin and a metallic magnetic powder supporting silica on the surface which is coated with sequential layers of the hydrolyzed silane compound and oleic acid.

The other embodiment of the present invention is to provide a process for preparing a magnetic recording medium by sequentially treating a metallic magnetic powder supporting silica on the surface with a methanol solution of a hydrolyzable silane compound and a toluene solution of oleic acid to obtain a magnetic powder having the coated sequential layers thereof and admixing the coated magnetic powder with a binder resin to prepare a magnetic composition and coating the magnetic composition on a substrate to form a magnetic layer.

The solvent for the silane compound should be alcohols or other solvents which allow the hydrolysis of the silane compound. The solvent for oleic acid can be selected from various solvents dissolving oleic acid and preferably non-polar solvents such as aromatic hydrocarbon so as to improve the adsorption of oleic acid.

In order to form the coated sequential layers of the silane compound and oleic acid on the surface of the metallic magnetic powder in the process of the present invention, the silane compound is dissolved in methanol and hydrolyzed and the metallic magnetic powder supporting silica on the surface is dipped in the solution to wet the magnetic powder whereby a condensation reaction of SiOH on the surface of the metallic magnetic powder with the hydrolyzed silanol results in covalent bond of the silane compound with the surface of the metallic magnetic powder. The reaction may be shown as follows.

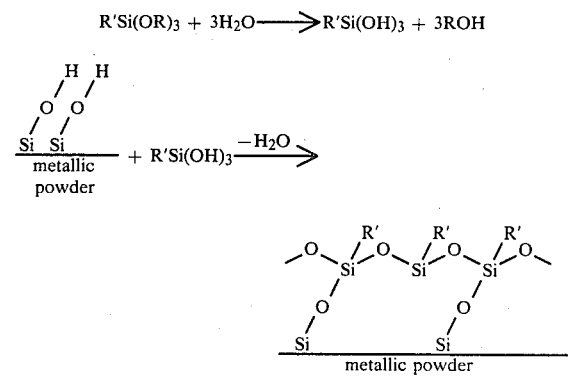

(R represents a lower alkyl group and R' represents an organic moiety).

The treated metallic magnetic powder is dried by heating in an inert gas or a reducing gas at 200° C. or lower. The dried powder is wetted with a toluene solution of oleic acid to form a coating layer of oleic acid on the silane compound layer and is dried.

Amounts of the silane compound and oleic acid are preferably 0.05 to 10 wt. parts preferably 0.5 to 5 wt. parts of the silane compound as 0.05 to 10 wt. parts preferably 0.5 to 5 wt. parts of oleic acid per 100 wt. parts of the metallic magnetic powder.

The silane compounds used in the present invention are preferably vinyl triethoxysilane, γ-methacryloxypropyl trimethoxysilane, γ-mercaptopropyl trimethoxysilane etc.

In the process of the present invention, it is indispensable to use a metallic magnetic powder supporting silica on the surface. When a metallic magnetic powder which has not silica on the surface is used, the silane compound is not satisfactorily bonded to the metal surface whereby when the treated magnetic powder is further wet treated with the toluene solution of oleic acid, the silane compound is removed from the metal surface to produce a metallic magnetic powder having inferior oxidation resistance. On the other hand, in accordance with present invention, the metallic magnetic powder supporting silica on the surface is used to form the covalent bond of the silica on the surface of the magnetic powder with the silane compound in the methanol solution whereby the removal of the silane compound bonded on the surface of the magnetic powder in the wet treatment with the toluene solution of oleic acid can be prevented.

The resulting metallic magnetic powder supporting silica on the surface which is coated with sequential layers of the silane compound and oleic acid imparts excellent dispersibility when it is admixed with a binder resin and coated by the conventional method on a substrate such as a polyester film. The magnetic layer in which the magnetic powder is uniformly dispersed in the binder resin can be formed.

The effect for improving the dispersibility is found in various resins used as the conventional binder resins such as polyvinyl chlorides, polyesters, polyurethanes and polybutyrals. That is, the present invention is to provide a magnetic recording medium having a magnetic layer in which the metallic magnetic powder is uniformly dispersed in the binder resin which can be any conventional binder resin.

The magnetic layer formed by the present invention has excellent stable characteristics of residual magnetic flux density in ageing, because the metallic magnetic powder coated with the silane compound has excellent oxidation resistance which is maintained even after forming the magnetic layer whereby the deterioration of the magnetic characteristic caused by the oxidation is prevented.

The present invention will be illustrated by certain examples and references which are provided for purposes of illustration only and are not intended to be limiting the present invention.

EXAMPLE

In 2.0 liter of methanol, vinyl triethoxysilane was dissolved to prepare 0.5% solution of vinyl triethoxysilane. The solution was admixed with 500 g. of metallic iron powder supporting silica on the surface which had a saturated magnetization ($\sigma$s) of 140 emu/g. and a coercive force (Hc) of 1,100 Oe to disperse it in an atomizer and the dispersion was heated in nitrogen gas at about 150° C. for 3 hours. During the heating, methanol was evaporated and covalent bond was formed between the silica on the surface of the metallic iron powder and the silane compound. The silane treated metallic iron powder was dipped into 20 liter of 0.5% solution of oleic acid in toluene and the mixture was treated by a separator. Then, the treated metallic iron powder was naturally dried to obtain a metallic iron powder having coated double layers of the silane compound and oleic acid which had a saturated magnetization ($\sigma$s) of 135 emu/g. and a coercive force (Hc) of 1,180 Oe.

A mixture of 500 wt. parts of the treated metallic iron powder, 90 wt. parts of a polyurethane (Nippolan No. 5033) manufactured by Nippon Polyurethane Co.), 35 wt. parts of nitrocellulose (H ½ sec. manufactured by Asahi Chemical Co.), 10 wt. parts of a lubricant, 300 wt. parts of methyl ethyl ketone and 300 wt. parts of methyl isobutyl ketone was thoroughly mixed to disperse it in a ball mill and then, 10 wt. parts of a polyisocyanate (Colonate L manufactured by Nippon Polyurethane Co.) as a hardner was added and the mixture was uniformly mixed again to prepare a magnetic composition.

The resulting magnetic composition was coated on a polyester film having a thickness of 15μ so as to form a dry coated layer having a thickness of 5μ, and the coated film was dried and the coated surface of the magnetic layer was treated by a super calender to provide the mirror surface processing. Then, the magnetic layer was cured by heating at 80° C. for 24 hours. The product was cut in a desired width to prepare a magnetic tape.

REFERENCE 1

In accordance with the process of Example except that the treatments for forming the coated layers of vinyl triethoxysilane and oleic acid were not carried out, a magnetic tape was prepared.

REFERENCE 2

In accordance with the process of Example except that toluene was used instead of methanol, a magnetic tape was prepared.

REFERENCE 3

In accordance with the process of Example except that the oleic acid coated layer was not formed on the coated layer of the metallic iron powder formed by the treatment of vinyl triethoxysilane, a magnetic tape was prepared.

REFERENCE 4

In accordance with the process of Example except that a metallic iron powder having no silica on the surface was used instead of the metallic iron powder used in Example, a magnetic tape was prepared.

Each residual magnetic flux density, each saturated magnetic flux density and each acicular ratio of each magnetic tape prepared in Example and References were measured. The results are shown in Table 1.

TABLE 1

|  | Residual magnetic flux density (gauss) | Saturated magnetic flux density (gauss) | Acicular ratio |
| --- | --- | --- | --- |
| Example | 2700 | 3460 | 0.78 |
| Reference 1 | 2100 | 3400 | 0.62 |
| Reference 2 | 2650 | 3500 | 0.76 |
| Reference 3 | 2000 | 3400 | 0.59 |
| Reference 4 | 2750 | 3500 | 0.79 |

In order to evaluate oxidation resistances of the magnetic tapes prepared in Example and References, each change of the residual magnetic flux density of each magnetic tape in ageing (in air at 50° C. and 98% relative humidity) was measured. The results are shown in Table 2.

TABLE 2

| | Change of residual magnetic flux density (%) | | |
| --- | --- | --- | --- |
| | at begining | after 30 days | after 60 days |
| Example | 0 | 3 | 8 |
| Reference 1 | 0 | 15 | 30 |
| Reference 2 | 0 | 9 | 17 |
| Reference 3 | 0 | 6 | 10 |
| Reference 4 | 0 | 10 | 18 |

The results of the measurements are considered. As shown in Reference 1, when the treatment for forming the coated layer is not carried out, the initial magnetic characteristic (Table 1) is lower and the change of the characteristic in ageing caused by the oxidation (Table 2) is higher to be inferior as the magnetic tape. When the oleic acid layer is formed on the metallic iron powder (Example, and References 2 and 4), the initial magnetic characteristics are excellent, however, the change of the magnetic characteristics in References 2 and 4 in ageing are so high to be inferior to that of Example. In Reference 2, toluene is used instead of methanol, whereby the hydrolysis of the silane compound is not high enough to react it with silica on the surface of the metallic iron powder. In Reference 4, silica is not placed on the metallic iron powder whereby satisfactory bonding of the silane compound to the surface of the metallic iron powder does not result. Therefore, the changes of the magnetic characteristics in ageing are high.

In Reference 3, the change of magnetic characteristics in ageing is similar to that of Example, however, the initial magnetic characteristics as a magnetic tape are remarkably inferior.

As it is clear from these data, the magnetic tape prepared by using the metallic iron powder supporting silica on the surface which is coated with the sequential layers of the silane compound and oleic acid, has excellent characteristics in view of the initial magnetic characteristics and deterioration of magnetic characteristics in ageing caused by the oxidation.

We claim:

1. A magnetic recording medium which comprises a substrate coated with a magnetic layer comprising a binder resin and a metallic magnetic powder supporting silica on its surface which is coated with sequential layers of hydrolyzed silane compound and oleic acid, wherein said hydrolyzed silane compound is bonded to said silica.

2. The magnetic recording medium according to claim 1 wherein said hydrolyzed silane compound is formed by hydrolysis of a silane compound having the formula $R'Si(OR)_3$ wherein R represents a lower alkyl group and R' represents an organic moiety.

3. A process for preparing a magnetic recording medium which comprises sequentially treating a metallic magnetic powder supporting silica on its surface with a solution of a hydrolyzable silane compound and a solution of oleic acid to obtain a magnetic powder having sequential coated layers, and admixing the coated magnetic powder with a binder resin to prepare a magnetic composition and coating the magnetic composition on a substrate to form a magnetic layer.

* * * * *